US 11,057,802 B2

(12) United States Patent
Nie

(10) Patent No.: US 11,057,802 B2
(45) Date of Patent: Jul. 6, 2021

(54) WIRELESS CLIENT STA ROAMING

(71) Applicant: NEW H3C TECHNOLOGIES CO., LTD., Hangzhou (CN)

(72) Inventor: Shuwei Nie, Beijing (CN)

(73) Assignee: NEW H3C TECHNOLOGIES CO., LTD., Hangzhou (CN)

( * ) Notice: Subject to any disclaimer, the term of this patent is extended or adjusted under 35 U.S.C. 154(b) by 19 days.

(21) Appl. No.: 16/619,369

(22) PCT Filed: Jun. 12, 2018

(86) PCT No.: PCT/CN2018/090725
§ 371 (c)(1),
(2) Date: Dec. 4, 2019

(87) PCT Pub. No.: WO2018/228347
PCT Pub. Date: Dec. 20, 2018

(65) Prior Publication Data
US 2020/0162971 A1 May 21, 2020

(30) Foreign Application Priority Data
Jun. 13, 2017 (CN) .......................... 201710441546.4

(51) Int. Cl.
*H04W 36/00* (2009.01)
*H04B 17/318* (2015.01)
(Continued)

(52) U.S. Cl.
CPC ...... *H04W 36/0072* (2013.01); *H04B 17/318* (2015.01); *H04W 8/12* (2013.01);
(Continued)

(58) Field of Classification Search
CPC ............. H04W 36/0072; H04W 76/11; H04W 36/0085; H04W 8/12; H04W 12/06;
(Continued)

(56) References Cited

U.S. PATENT DOCUMENTS 9,699,144 B2 * 7/2017 Chechani .............. H04W 76/15
2004/0229621 A1 11/2004 Misra
(Continued)

FOREIGN PATENT DOCUMENTS

CN 103067975 4/2013
CN 104301957 1/2015
(Continued)

OTHER PUBLICATIONS

Lin, Yi-Bing, Ying-Ju Shih, and Pei-Wen Chao. "Design and implementation of LTE RRM with switched LWA policies." IEEE Transactions on Vehicular Technology 67.2 (2017): 1053-1062. (Year: 2017).*
(Continued)

*Primary Examiner* — Sharad Rampuria
(74) *Attorney, Agent, or Firm* — Norton Rose Fulbright US LLP

(57) ABSTRACT

A method and a device for roaming a wireless STA are provided. The method and the device may be applied to an access controller (AC) in a wireless local area network. According to an example of the method, an STA of interest to be roamed from a first Access Point (AP) to a second AP is determined and the STA of interest is roamed from the first AP to the second AP by controlling the STA of interest to be switched from a working channel of the first AP to a working channel of the second AP.

14 Claims, 4 Drawing Sheets

(51) Int. Cl.
*H04W 76/11* (2018.01)
*H04W 8/12* (2009.01)
*H04W 12/06* (2021.01)
*H04W 84/12* (2009.01)

(52) U.S. Cl.
CPC ....... *H04W 12/06* (2013.01); *H04W 36/0066* (2013.01); *H04W 36/0085* (2018.08); *H04W 76/11* (2018.02); *H04W 84/12* (2013.01)

(58) Field of Classification Search
CPC . H04W 36/0066; H04W 84/12; H04W 36/22; H04W 28/085; H04W 36/0011; H04W 36/0055; H04W 36/00; H04W 36/0005; H04W 36/0007; H04W 36/0009; H04W 36/0016; H04W 36/03; H04B 17/318; H04B 7/18541; H04L 47/767
See application file for complete search history.

(56) References Cited

U.S. PATENT DOCUMENTS

| | | | |
|---|---|---|---|
| 2010/0118830 A1 | 5/2010 | Stephenson et al. |
| 2015/0334598 A1 | 11/2015 | Duo et al. |
| 2015/0358885 A1 | 12/2015 | Choi |
| 2016/0119819 A1 | 4/2016 | Ardeli et al. |

FOREIGN PATENT DOCUMENTS

| | | |
|---|---|---|
| CN | 104602308 | 5/2015 |
| CN | 105191413 | 12/2015 |
| JP | 2017038126 | 2/1917 |
| JP | 2009284487 | 12/2009 |
| JP | 2014241689 | 12/2014 |

OTHER PUBLICATIONS

International Search Report and Written Opinion Issued in PCT Application No. PCT/CN2018/090725, dated Jul. 24, 2018 (English Translation of Search Report Provided).

Zhihong, Liu. *A Study of Association Control Load Balancing in 802.11 Wireless Lans*. 2011. Graduate School of National University of Defense Technology, Master's Thesis (English Abstract).

Extended European Search Report issued in corresponding European Application No. 18818666.2, dated Apr. 23, 2020.

Office Action issued in Corresponding Japanese Application No. 2020-517257, dated Feb. 9, 2021 (English Translation provided).

* cited by examiner

WIRELESS CLIENT STA ROAMING

CROSS REFERENCE TO RELATED APPLICATIONS

This application is a national phase under 35 U.S.C. § 371 of International Application No. PCT/CN2018/090725, filed Jun. 12, 2018, which claims priority to Chinese Patent Application No. 201710441546.4 entitled "METHOD AND DEVICE FOR ROAMING WIRELESS STATION" filed on Jun. 13, 2017, the entire contents of each of which are incorporated herein by reference in their entirety.

BACKGROUND

The present disclosure relates to roaming a wireless station (STA).

In a Wireless Local Area Network (WLAN), a plurality of Access Points (AP) may be deployed to ensure any STA in the WLAN can complete access and communication.

In a WLAN, an AP may provide a bridging function from a wireless user to a local area network so that wireless or wired frame transformation may be performed between an STA and the WLAN. Adjacent APs may work in different channels to avoid that STAs connected to these APs are affected by each other during communication. For example, assume that a first AP is adjacent to a second AP in the WLAN and the first AP and the second AP may work in a frequency segment of 802.11a (802.11n/802.11ac). In this case, according to bandwidth settings by 802.11a, the first AP may work in channel 149 and the second channel may work in channel 36; or the first AP may work in channel 1 and the second AP may work in channel 6 and so on.

BRIEF DESCRIPTION OF THE DRAWINGS

The accompanying drawings, which are incorporated in and constitute a part of the present description, illustrate examples consistent with the present disclosure and serve to explain the principles of the present disclosure together with the description.

DETAILED DESCRIPTION

Figure 1:
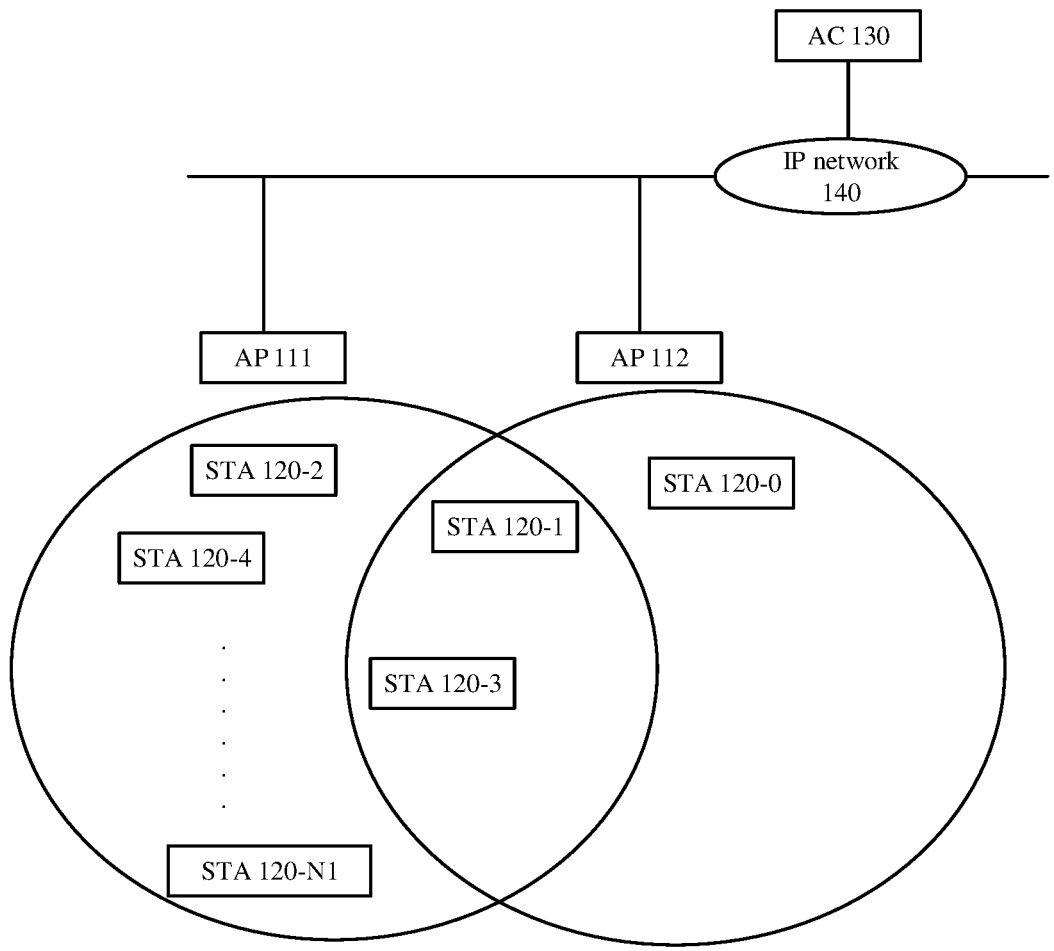
FIG. 1 is a schematic diagram illustrating application of a network according to an example of the present disclosure.

In a WLAN, it may occur that a particular AP is connected to a plurality of STAs but an AP adjacent to the particular AP is connected to relatively less STAs. For example, as shown in FIG. 1, an AP 111 is adjacent to an AP 112, and the AP 111 is connected to N1 STAs from STA 120-1 to STA 120-N1, and the AP 112 is connected to only one STA, i.e., STA 120-0. Since the number of the STAs connected to the AP 111 is relatively more, the bandwidth resources may be insufficient so that the connected STAs may compete against each other for bandwidths. However, since the number of the STAs connected to the AP 112 is relatively less, maybe many bandwidth resources are idle.

In a practical application, if an STA is connected to an AP in a worse signal strength, when the STA is switched to an adjacent AP, the signal strength may be better. For example, the STA 120-3 locates in a signal coverage overlapping region of the AP 111 and the AP 112, and if the STA 120-3 is switched from the AP 111 to the AP 112, the signal strength may be better. Alternatively, the STA 120-1 is previously connected to the AP 111 because it is close to the AP 111, and subsequently, due to the position movement, the STA 120-1 is moved to a signal coverage region of the AP 112, but the STA 120-1 is still connected to the AP 111. In this case, if the STA 120-1 is switched from the AP 111 to the AP 112, that is, the STA 120-1 is roamed from the AP 111 to the AP 112, the signal effect may become better.

However, being restricted to program implementation of STA, neither STA will actively roam to another adjacent AP unless signals from the originally connected AP are so weak. As shown in FIG. 1, even if the signal strength in the connection with the AP 112 is higher than in the connection with the AP 111, the STA 120-1 will not actively roam from the AP 111 to the AP 112 since the signals from the AP 111 are not bad enough.

To this end, the present disclosure provides a method of roaming STA. According to this method, without affecting STA communication, an STA of interest which is to be roamed may be associated by channel switching with an adjacent AP capable of providing better service, so that loads between adjacent APs can be effectively balanced.

Figure 2A:
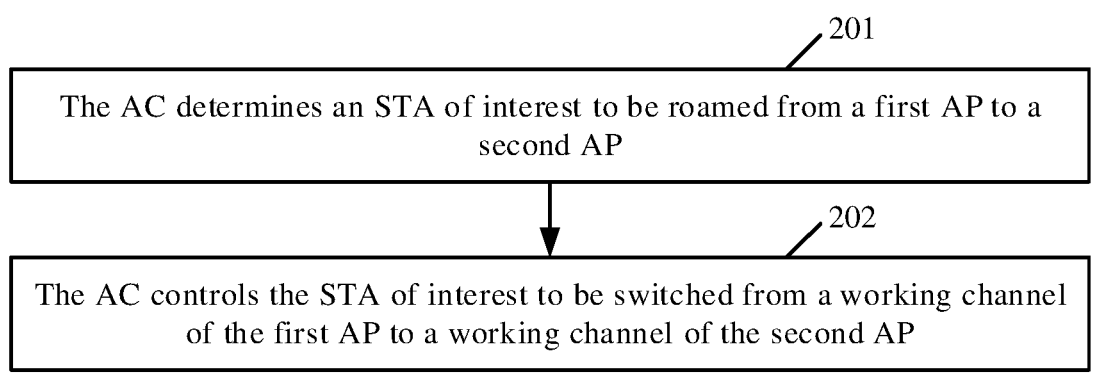
FIGS. 2A-2C are schematic flowcharts illustrating a method according to an example of the present disclosure.

FIG. 2A is a flowchart illustrating a method according to an example of the present disclosure. The flow may be applied to an Access Controller (AC). The AC is used to perform control and management over all APs in a WLAN and perform STA authentication by interacting with an authentication server.

As shown in FIG. 2A, the flow may include the following blocks.

At block 201, the AC may determine an STA of interest to be roamed from a first AP to a second AP.

In the present disclosure, the first AP and the second AP may be adjacent APs, where the first AP or the second AP is not referred to a particular AP but named to distinguish two adjacent APs, which is not limited herein.

In an example, the AC may select the STA of interest to be roamed to the second AP from the STAs currently connected to the first AP. For example, if the AC detects that the first AP satisfies a first condition and the second AP adjacent to the first AP satisfies a second condition, the AC may select the STA of interest to be roamed to the second AP from the STAs currently connected to the first AP.

The first condition may be that the number of STAs that are currently connected to the first AP and are successfully authenticated by the AC is greater than a set threshold and/or a current load of the first AP is greater than a set load, where the current load of the first AP may be a current average load of the first AP.

The second condition may be that the number of STAs that are currently connected to the second AP and are successfully authenticated by the AC is less than a set threshold and a current load of the second AP is smaller than a set load, where the current load of the second AP may be a current average load of the second AP.

The set threshold and the set load as above may be defined based on service requirements and will not be limited herein.

Description will be made below on how the STA of interest to be roamed to the second AP is selected from the STAs currently connected to the first AP when it is detected that the first AP satisfies the first condition and the second AP adjacent to the first AP satisfies the second condition.

At block 202, the AC may control the STA of interest to be switched from a working channel of the first AP to a working channel of the second AP so that the STA of interest is roamed from the first AP to the second AP.

In the present disclosure, the AC may control the STA of interest to be switched from the working channel of the first AP to the working channel of the second AP, which may specifically include that:

for each STA of interest, if it is detected that the second AP satisfies a third condition, the STA of interest may be controlled to be switched from the working channel of the first AP to the working channel of the second AP, where the third condition may be that the number of the STAs that are currently connected to the second AP and are successfully authenticated by the AC is less than the difference between the set threshold and 1, and the current average load of the second AP is less than the difference between the set load and the load of the STA of interest. It can be ensured by detecting the third condition that the signal strength can be increased after the STA roams to the second AP and the load of the second AP will not exceed the tolerance range due to additional connection with the STA.

Figure 2B:
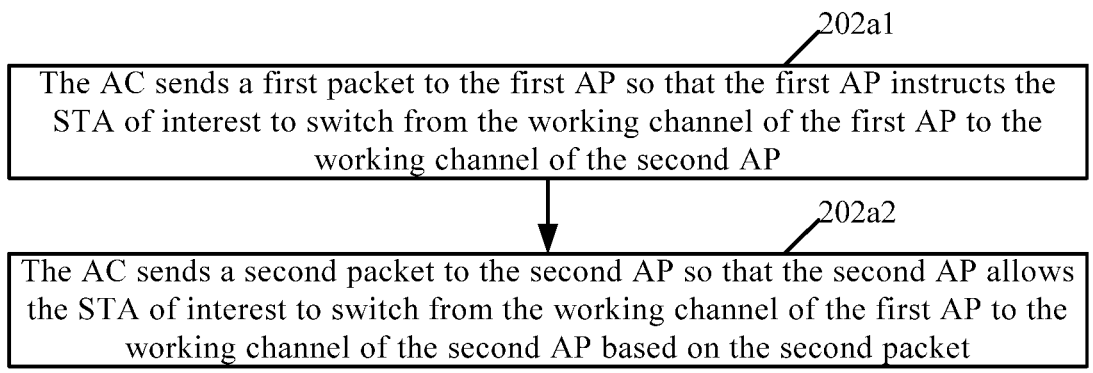

The STA of interest may be controlled to be switched from the working channel of the first AP to the working channel of the second AP by blocks shown in FIG. 2B when the AC detects that the second AP satisfies the third condition, where the blocks in FIG. 2B may include block 202a1 and 202a2.

At block 202a1, the AC may send a first packet to the first AP so that the first AP instructs the STA of interest to switch from a first working channel to a second working channel.

In an example, when the first AP receives the first packet from the AC, the first AP may instruct the STA of interest to switch from the first working channel to the second working channel by sending a channel switching packet to the STA of interest. After receiving the channel switching packet, the STA of interest may initiate an operation of switching from the first working channel to the second working channel.

In an example, the first packet may be a probe-response frame in a WLAN and may be added with an information element indicating channel switching by extension. The added information element may include at least an identifier of the first working channel and an identifier of the second working channel and so on.

At block 202a2, the AC may send a second packet to the second AP so that the second AP allows the STA of interest to be switched from the working channel of the first AP to the working channel of the second AP according to Service Set Identifier (SSID) associated with the STA of interest, an identifier of the first AP currently connected to the STA of interest, an identifier of the second AP to be connected to the STA of interest carried in the second packet.

In an example, the second packet may also carry Basic Service Set Identifier (BSSID) associated with the STA of interest. In this case, after obtaining the BSSID associated with the STA of interest, the SSID associated with the STA of interest, the identifier of the first AP currently connected to the STA of interest, and the identifier of the second AP to be connected to the STA of interest from the second packet, the second AP may send a unicast beacon packet to the STA of interest by using the obtained BSSID. In this way, in response to the beacon packet, the STA of interest may actively associate with the above SSID when initiating the operation of switching from the working channel of the first AP to the working channel of the second AP as above. Finally, the STA of interest switches from the working channel of the first AP to the working channel of the second AP.

In an example, the second packet may be a Controlling and Provision of wireless Access Point (CAPWAP) packet, where the second packet carries at least the identifier of the STA of interest, the BSSID and the SSID associated with the STA of interest, the identifier of the first AP currently connected to the STA of interest and the identifier of the second AP to be connected to the STA of interest.

By blocks 202a1 and 202a2, the STA of interest can be controlled to be switched from the working channel of the first AP to the working channel of the second AP, indirectly realizing roaming of the STA.

Thus, the flow shown in FIG. 2A is completed. It can be seen from the flow shown in FIG. 2A that, without affecting STA communication, the STA may be roamed to an AP capable of providing better service by switching working channels between adjacent APs, thereby effectively adjusting loads between adjacent APs and further effectively improving network robustness of a WLAN.

Figure 2C:
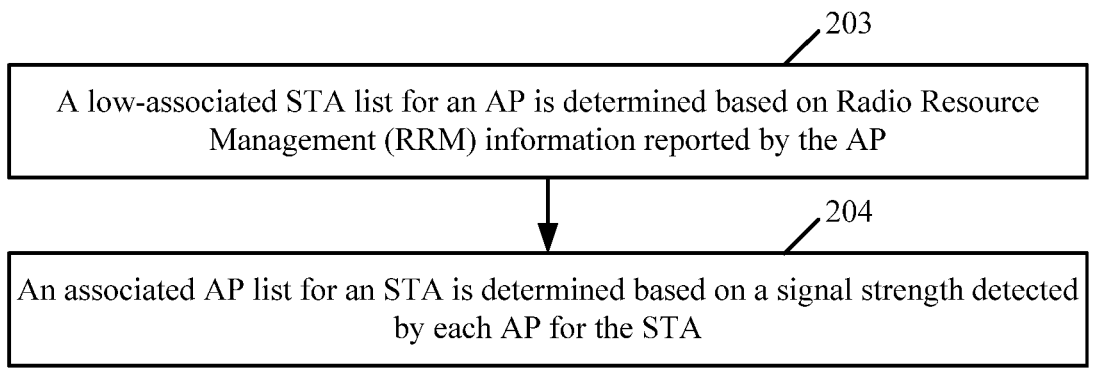

In an example, to select the STA of interest to be roamed to the second AP from the STAs currently connected to the first AP when detecting that the first AP satisfies the first condition and the second AP adjacent to the first AP satisfies the second condition, the AC may implement the following blocks 203 and 204 shown in FIG. 2C before implementing the flow shown in FIG. 2A.

At block 203, a low-associated STA list for an AP may be determined based on Radio Resource Management (RRM) information reported by the AP, where the low-associated STA list for the AP may contain N STAs whose signal strengths are detected by the AP to be smaller than a default signal strength P. In an example, the number N of STAs that may be contained in the low-associated STA list for the AP is limited. For example, the N is not greater than an assigned value Nmax. That is, even though the number Nt of STAs whose signal strengths are detected by the AP to be smaller than the default signal strength P is greater than Nmax, the Nt STAs may not be all added into the low-associated STA list for the AP but sorted in an ascending order based on signal strengths and then the first Nmax STAs in the sequence may be selected and added into the low-associated STA list for the AP.

At block 204, an associated AP list of an STA may be determined based on a signal strength detected by each AP for the STA. If the signal strength of the STA is detected by the AP to be greater than the default signal strength P, the AP may be recorded in the associated AP list of the STA as an AP associated with the STA. The number M of the APs that may be contained in the associated AP list of the STA is limited. For example, M is not greater than an assigned value Mmax. That is, even though the signal strength of the STA is detected by Mt (greater than M) APs to be greater than the default signal strength P, the Mt APs will not be added into the associated AP list of the STA as APs associated with the STA but sorted in a descending order based on the detected signal strengths and then the first Mmax APs in the sequence are selected and added into the associated AP list of the STA as APs associated with the STA. In an example, the above default signal strength P may be set based on requirements.

Based on this, selecting the STA of interest to be roamed from the STAs currently connected to the first AP as above may include that: if an STA currently connected to the first AP is not contained in the low-associated STA list for the second AP and the associated AP list of the STA includes the second AP but does not include the first AP, the STA may be determined as an STA of interest.

Figures 3, 4:
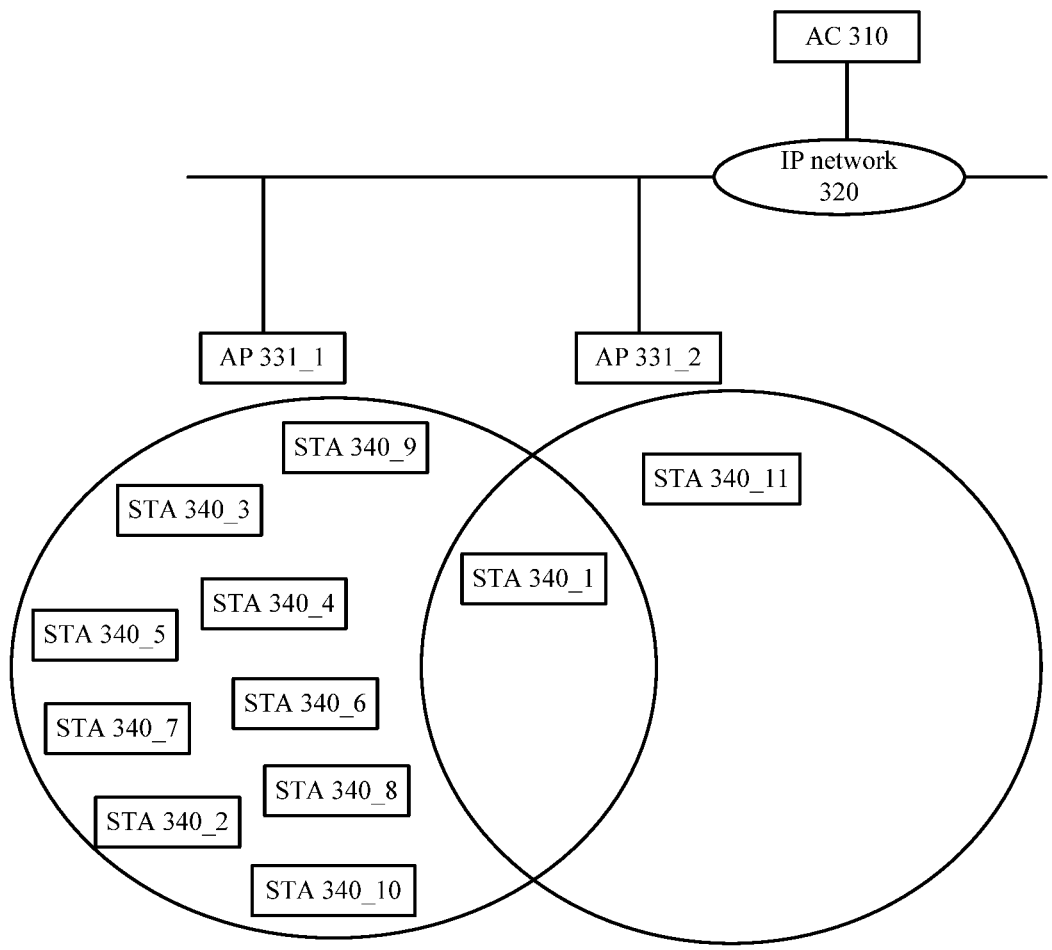
FIG. 3 is a schematic diagram illustrating an application network according to an example of the present disclosure.
FIG. 4 is a schematic diagram illustrating an information element indicating channel switching according to an example of the present disclosure.

The processes shown in FIGS. 2A-2C will be described below with a specific example. FIG. 3 is a schematic diagram illustrating an application network according to an example of the present disclosure. FIG. 3 shows only two adjacent APs: AP 331_1 and AP 331_2.

As shown in FIG. 3, the AP 331_1 is connected to ten STAs in total, i.e., STA 340_1, STA 340_2, STA 340_3, STA 340_4, . . . and STA 340_10; and the AP 331_2 is connected to only one STA, i.e., STA 340_11.

In FIG. 3, the AP 331_1 may report RRM information in a set period. The RRM information reported by the AP 331_1 may include at least: a total number (i.e., 10) of STAs currently connected to the AP 331_1, data traffic volume through the AP 331_1 in the period, a working channel of the AP 331_1, a signal strength of each STA currently connected to the AP 331_1. The data traffic volume through the AP 331_1 in the period may include data traffic volume from each currently-connected STA to the AP 331_1 and data traffic volume from an AC 310 to each STA currently connected to the AP 331_1.

The AC 310 may receive the RRM information reported by the AP 331_1 via an IP network 320.

The AC 310 may determine the following information related to the AP 331_1 based on the RRM information reported by the AP 331_1: a total number (i.e., 10) of the STAs currently connected to the AP 331_1, a load of the AP 331_1 determined based on the data traffic volume through the AP 331_1 in the period and a working channel of the AP 331_1.

The low-associated STA list for the AP 331_1 may contain STAs whose signal strengths are detected by the AP 331_1 to be smaller than the default signal strength P. It is to be noted that the number N of the STAs that may be contained in the low-associated STA list for the AP 331_1 is limited, for example, limited to Nmax. In this way, when the number Nt of STAs whose signal strengths are detected by the AP 331_1 to be smaller than the default signal strength P is greater than Nmax, the Nt STAs may be sorted in an ascending order based on signal strengths and then the first Nmax STAs in the sequence are selected and added into the low-associated STA list for the AP 331_1. However, when Nt is less than or equal to Nmax, the Nt STAs may be directly added into the low-associated STA list for the AP 331_1.

In an example, signal strengths of STA 340_1 and STA 340_2 detected by the AP 331_1 are smaller than the default signal strength P, and the low-associated STA list for the AP 331_1 is shown as table 1:

TABLE 1

| STAs whose signal strengths being smaller than the default signal strength P | STA 340_1, STA 340_2 |
|---|---|

Similarly, the AP 331_2 may also report RRM information in a set period. The RRM information reported by the AP 331_2 may include at least: a total number (i.e., 1) of STAs currently connected to the AP 331_2, data traffic volume through the AP 331_2 in the period, which includes data traffic volume from the STA 340_11 currently connected to the AP 331_2 to the AP 331_2 and data traffic volume from the AC 310 to the STA 340_11, a working channel of the AP 331_2 and a signal strength of STA 340_11.

The AC 310 may receive the RRM information from the AP 331_2 via the IP network 320.

The AC 310 may determine the following information related to the AP 331_2 based on the RRM information reported by the AP 331_2: a total number (i.e., 1) of the STAs currently connected to the AP 331_2; a load of the AP 331_2 determined based on the data traffic volume through the AP 331_2 in the period (also referred to as an average load); and a working channel of the AP 331_2.

The low-associated STA list for the AP 331_2 may contain currently connected STAs whose signal strengths are detected by the AP 331_2 to be smaller than the default signal strength P. If the signal strength of the STA 340_11 currently connected to the AP 331_2 is greater than or equal to the default signal strength P, the low-associated STA list for the AP 331_2 is empty. In an example, when the signal strength of the STA3_11 connected to the AP 331_2 is greater than the default signal strength P, the low-associated STA list for the AP 331_2 is empty.

For each STA in a WLAN, the AC 310 may detect the signal strength of the STA by using the AP 331_1 and the AP 331_2 in the WLAN respectively. The STA 340_1 is taken as an example herein. It is assumed that the signal strength of the STA 340_1 detected by the AP 331_1 is P0, the signal strength of the STA 340_1 detected by the AP 331_2 is P1, the signal strength P0 is smaller than the default signal strength P and the signal strength P1 is greater than the default signal strength P. The AC 310 may determine the AP 331_2 as an AP associated with the STA 340_1, and record the AP 331_2 in the associated AP list of the STA 340_1. It is to be noted that the number M of APs that may be contained in the associated AP list of the STA 340_1 is limited, for example, limited to Mmax. In this way, when the signal strengths of the STA 340_1 detected by Mt (greater than Mmax) APs are greater than the default signal strength P, the Mt APs may be sorted in a descending order based on the detected signal strengths and then the first Mmax APs in the sequence may be selected and added into the associated AP list of the STA 340_1 as APs associated with the STA 340_1. However, when Mt is less than or equal to Mmax, the Mt APs may be directly added into the associated AP list of the STA 340_1.

Similarly, the AC 310 may also determine an associated AP list for each of STA 340_2 to STA 340_11 respectively.

If detecting that AP 331_1 satisfies the first condition of "a total number of currently connected STAs is greater than a set threshold (for example, 9), and/or a load of the AP 331_1 is greater than a set load", the AC 310 may determine whether the AP 331_2 adjacent to the AP 331_1 satisfies the second condition of "the total number of STAs currently connected to the AP 331_2 is smaller than the set threshold (for example, 9), and the load of the AP 331_2 is smaller than the set load".

As described above, the total number of STAs currently connected to the AP 331_2 is 1 which is far less than the set threshold (for example, 9). Thus, assume the load of AP 331_2 is smaller than the set load, it may be determined that the AP 331_2 satisfies the above second condition. In this example, the AP 331_2 satisfies the second condition.

When determining the AP 331_2 adjacent to the AP 331_1 satisfies the second condition, the AC 310 may determine whether the third condition below is satisfied for each STA (for example, STA 340_1) currently connected to the AP 331_1.

The third condition may be that the STA 340_1 is not contained in the low-associated STA list for the AP 331_2 and the associated AP list of the STA 340_1 includes the AP 331_2 but does not include the AP 331_1.

As described above, the low-associated STA list for the AP 331_2 is empty and the associated AP list of the STA 340_1 includes the AP 331_2 but does not include the AP 331_1, which means the above third condition is satisfied. The case that the above third condition is not satisfied will not be described in the example.

Thus, it may be determined that the STA 340_1 needs to roam from the AP 331_1 to the AP 331_2. It may also be detected that the AP 331_2 will not satisfy the above first condition even though the STA 340_1 roams to the AP 331_2. Therefore, the AC 310 may send a PACKET-A (i.e., the above first packet) to the AP 331_1. The PACKET-A may be a probe-response packet which carries an identifier of the STA 340_1 to be roamed from the AP 331_1 to the AP 331_2 and an information element indicating channel switching. FIG. 4 illustrates a structure of the information element. The AP 331_1 may send a channel switching packet to the STA 340_1 to instruct the STA 340_1 to switch from the working channel of the AP 331_1 to the working channel of the AP 331_2. After receiving the channel switching packet, the STA 340_1 may initiate an operation of switching from the working channel of the AP 331_1 to the working channel of the AP 331_2 based on the instruction of the channel switching packet.

The AC 310 may also send a PACKET-B (i.e., the above second packet) to the AP 331_2, where the PACKET-B may be a CAPWAP packet which carries an identifier of the STA 340_1, a BSSID and an SSID associated with the STA 340_1, a working channel of the AP 331_1, and a working channel of the AP 331_2. After receiving the PACKET-B, the AP 331_2 may obtain and record the following entry [the identifier of STA 340_1, the BSSID, SSID associated with the STA 340_1, the working channel of the AP 331_1 and the working channel of AP 331_2] from the PACKET-B, and send a unicast beacon packet in a WLAN by using the BSSID in the entry. When another STA other than the STA 340_1 in the WLAN receives the beacon packet, if the STA requests association with the above SSID to the AP 331_2, the AP 331_2 may reject the request and only allow the STA 340_1 to associate with the above SSID. When receiving the beacon packet, the STA 340_1 may perform the operation of association with the above SSID during the operation of switching from the working channel of the AP 331_1 to the working channel of the AP 331_2 as above and may be successfully associated with the above SSID. Finally, it may be achieved that the STA 340_1 is switched from the working channel of the AP 331_1 to the working channel of AP 331_2.

It is to be noted that, in the example, after sending the channel switching packet to the STA 340_1, the AP 331_1 may update a locally-recorded working state of the STA 340_1 from an original valid state to an invalid state to indicate the current STA 340_1 is in a process of switching working channels.

If the AP 331_1 has not received data from the STA 340_1 nor received data sent by the AC 310 to the STA 340_1 in a period of time T after updating the locally-recorded working state of the STA 340_1 from the valid state to the invalid state, it means that the STA 340_1 is successfully switched from the working channel of the AP 331_1 to the working channel of the AP 331_2, which is equivalent to that STA 340_1 successfully completes roaming. The AP 331_1 may delete the locally-recorded working state of the STA 340_1.

If the AP 331_1 receives data from the STA 340_1 and/or receives data sent by the AC 310 to the STA 340_1 in a period of time T after updating the locally-recorded working state of the STA 340_1 from the valid state to the invalid state, the locally-recorded working state of the STA 340_1 may be restored from the invalid state to the valid state, which means that the STA 340_1 is not successfully switched from the working channel of the AP 331_1 to the working channel of the AP 331_2, equivalent to that STA 340_1 fails to roam.

When the STA 340_1 is successfully switched from the working channel of the AP 331_1 to the working channel of the AP 331_2, equivalent to that STA 340_1 successfully completes roaming, the AC 310 may send a data flow sent to the STA 340_1 to the AP 331_2 based on the BSSID and SSID associated with the STA 340_1 and the AP 331_2 may then send the data flow to the STA 340_1. That is, since the STA 340_1 is already switched from the working channel of the AP 331_1 to the working channel of the AP 331_2, the AP 331_1 will not receive a data flow sent to the STA 340_1 nor receive a data flow sent by the STA 340_1.

Thus, the description of the example is completed.

It can be seen from the above examples that the STA 340_1 can be roamed from the AP 331_1 to the AP 331_2 by switching the STA 340_1 from the working channel of the AP 331_1 to the working channel of the AP 331_2, thereby effectively reducing the load of the AP 331_1 and improving the signal strength of the STA 340_1.

The method provided in the present disclosure is described above. A device provided in the present disclosure will be described below.

Figure 5:
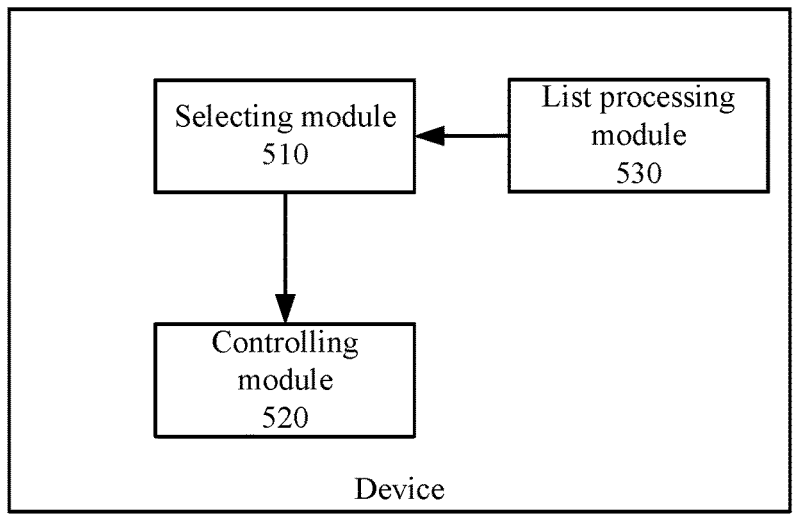
FIG. 5 is a schematic diagram illustrating a structure of a device according to an example of the present disclosure.

FIG. 5 is a schematic diagram illustrating a structure of a device for roaming an STA according to an example of the present disclosure. The device may be applied to an Access Controller (AC) and includes: a selecting module 510 configured to determine an STA of interest to be roamed to a second access point (AP) from STAs currently connected to a first AP; and a controlling module 520 configured to control the STA of interest to be switched from a working channel of the first AP to a working channel of the second AP so that the STA of interest is roamed from the first AP to the second AP.

In an example, the selecting module 510 selects the STA of interest to be roamed to the second AP from the STAs currently connected to the first AP, which may specifically include: selecting the STA of interest to be roamed to the second AP from the STAs currently connected to the first AP when it is detected that the first AP satisfies a first condition and the second AP adjacent to the first AP satisfies a second condition, where the first condition may be that the number of STAs currently connected to the first AP is greater than a set threshold and/or a current average load of the first AP is greater than a set load; and the second condition may be that the number of STAs currently connected to the second AP is less than a set threshold and a current average load of the second AP is less than a set load.

In an example, the device may further include: a list processing module 530 configured to determine a low-associated STA list for an AP according to Radio Resource Management (RRM) information reported by the AP and determine an associated AP list of an STA based on signal strengths of the STA detected by APs, where the low-associated STA list for the AP records STAs whose signal strengths are detected by the AP to be smaller than a default signal strength P and the number N of the STAs that may be contained in the low-associated STA list for the AP is assigned a maximum value Nmax; and the associated AP list of the STA records APs detecting that the signal strengths of the STA are greater than the default signal strength P and the number M of APs that may be contained in the associated AP list of the STA is assigned a maximum value Mmax.

Based on this, the selecting module 510 may select the STA of interest to be roamed to the second AP from the STAs currently connected to the first AP, which specifically includes: determining the STA as an STA of interest to be roamed from the first AP to the second AP when the STA currently connected to the first AP is not contained in the low-associated STA list for the second AP and the associated AP list of the STA includes the second AP but does not include the first AP.

In an example, the controlling module 520 may control the STA of interest to be switched from the working channel of the first AP to the working channel of the second AP, including: controlling the STA of interest to be switched from the working channel of the first AP to the working channel of the second AP when it is detected that the number of STAs that are connected to the second AP and are successfully authenticated by an AC is less than the difference between a set threshold and 1 and that the current average load of the second AP is less than the difference between a set threshold and the load of the STA of interest.

In an example, the controlling module 520 may control the STA of interest to roam from the first AP to the second AP, which may specifically include: sending a first packet to the first AP so that the first AP instructs the STA of interest to switch from the working channel of the first AP to the working channel of the second AP; sending a second packet to the second AP so that the second AP may allow the STA of interest to be switched from the working channel of the first AP to the working channel of the second AP based on a service set identifier (SSID) associated with the STA of interest, an identifier of the first AP currently connected to the STA of interest, and an identifier of the second AP to be connected with the STA of interest carried in the second packet.

Thus, description of the device shown in FIG. 5 is completed.

Figure 6:
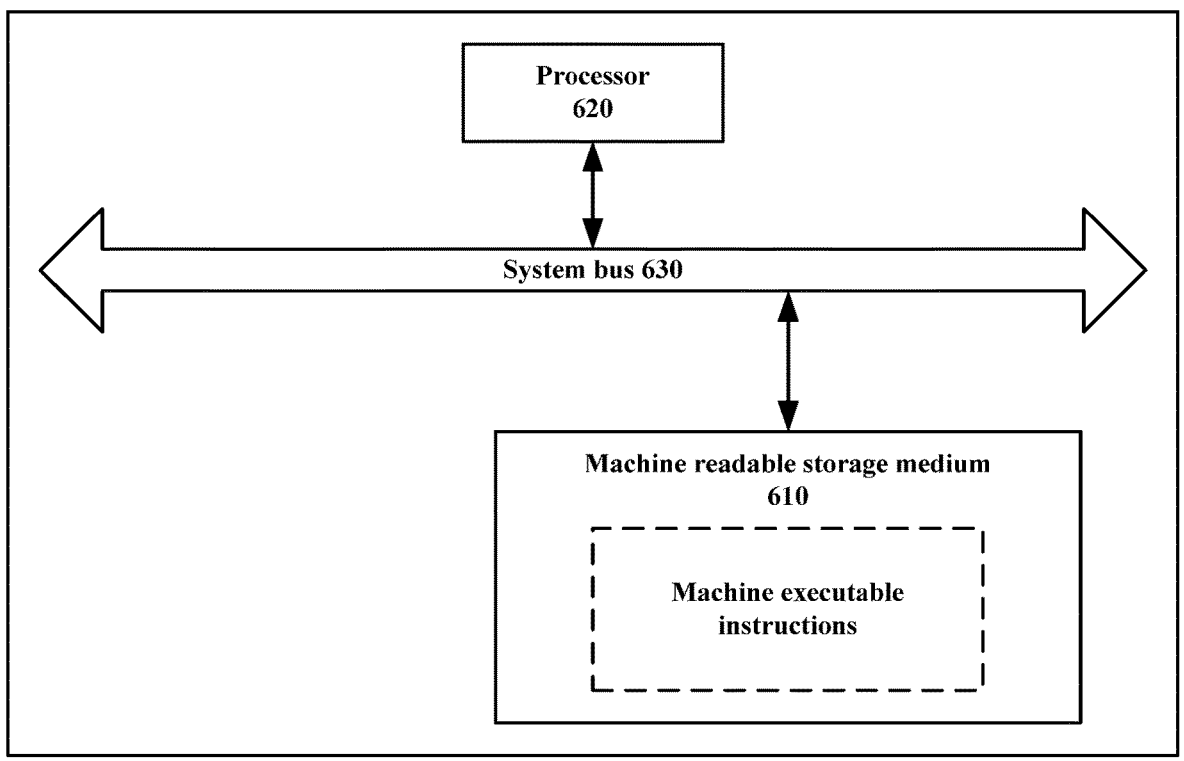
FIG. 6 is a schematic diagram illustrating a hardware structure of the device shown in FIG. 5 according to an example of the present disclosure.

Correspondingly, the present disclosure also provides a hardware structure of a device for roaming an STA shown in FIG. 5. As shown in FIG. 6, the structure may include a machine-readable storage medium 610, and a processor 620. The machine readable storage medium 610 and the processor 620 may communicate with each other via a system bus 630.

The machine-readable storage medium 610 may store machine executable instructions, and specifically may store machine executable instructions corresponding to the operations performed by the above selecting module 510, the controlling module 520, and the list processing module 530.

The processor 620 is configured to load and execute the machine executable instructions to select an STA of interest to be roamed to a second AP from STAs currently connected to a first AP and control the STA of interest to be switched from a working channel of the first AP to a working channel of the second AP, thereby realizing that the STA of interest is roamed from the first AP to the second AP.

In an example, the machine readable storage medium may be any electronic, magnetic, optical or other physical storage devices for containing or storing information such as executable instructions and data. The machine readable storage medium 610 may be a volatile memory, a nonvolatile memory, or a similar storage medium. For example, the machine readable storage medium 601 may be a Random Access Memory (RAM), a flash memory, a storage drive (e.g. hard disk drive), a solid state hard disk, any type of storage disk (e.g., optical disk, Digital Video Disk (DVD)), or a combination thereof.

Thus, the description of the hardware structure shown in FIG. 6 is completed.

The present disclosure also provides a machine-readable storage medium 610. The machine readable storage medium 610 stores machine executable instructions. When the machine executable instructions are invoked and executed by a processor 620, the processor 620 may be caused to select an STA of interest to be roamed to a second AP from STAs currently connected to a first AP and control the STA of interest to be switched from a working channel of the first AP to a working channel of the second AP, thereby realizing that the STA of interest is roamed from the first AP to the second AP.

The foregoing description is merely illustrative of preferred examples of the present disclosure but not intended to limit the present disclosure, and any modifications, equivalent substitutions, improvements thereof made within the spirit and principles of the disclosure shall be encompassed in the scope of protection of the present disclosure.

The invention claimed is:

1. A method of roaming a wireless Station (STA), comprising:
   determining, by an Access Controller (AC), an STA of interest which is to be roamed from a first Access Point (AP) to a second AP; and
   controlling, by the AC, the STA of interest to be switched from a working channel of the first AP to a working channel of the second AP so that the STA of interest is roamed from the first AP to the second AP,
   wherein determining the STA of interest comprises selecting, by the AC, the STA of interest to be roamed to the second AP from STAs currently connected to the first AP, and
   wherein selecting the STA of interest comprises:
      determining, by the AC, a low-associated STA list for the second AP according to Radio Resource Management (RRM) information reported by the second AP, wherein the low-associated STA list for the second AP contains STAs whose signal strengths are detected by the second AP to be smaller than a default signal strength P;
      determining, by the AC, an associated AP list for an STA currently connected to the first AP according to RRM information reported by a plurality of APs in a Wireless Local Area Network (WLAN) to which the AC belongs, wherein the associated AP list for the STA contains APs which detect signal strengths for the STA greater than the default signal strength P; and
      determining, by the AC, whether the STA is the STA of interest based on the low-associated STA list for the second AP and the associated AP list for the STA.

2. The method according to claim 1, wherein:
   selecting, by the AC, the STA of interest to be roamed to the second AP from STAs currently connected to the first AP, when detecting that the first AP satisfies a first condition and the second AP adjacent to the first AP satisfies a second condition;
   wherein the first condition comprises any one or more of the following conditions:

the number of the STAs currently connected to the first AP is greater than a set threshold, and a current average load of the first AP is greater than a set load; and wherein the second condition comprises that:

the number of STAs currently connected to the second AP is less than a set threshold and a current average load of the second AP is less than a set load.

3. The method according to claim 1, wherein determining whether the STA is the STA of interest based on the low-associated STA list for the second AP and the associated AP list for the STA comprises:

when the STA is not contained in the low-associated STA list for the second AP and the second AP is contained in but the first AP is not contained in the associated AP list for the STA, determining, by the AC, that the STA is the STA of interest to be roamed from the first AP to the second AP.

4. The method according to claim 1, wherein determining the low-associated STA list for the second AP according to the RRM information reported by the second AP comprises:

when determining, according to the RRM information reported by the second AP, that signal strengths for Nt STAs detected by the second AP are smaller than the default signal strength P, selecting, by the AC, Nmax STAs whose signal strengths are the smallest from the Nt STAs and adding the Nmax STAs to the low-associated STA list for the second AP, wherein Nt>Nmax.

5. The method according to claim 1, wherein determining the associated AP list for the STA according to the RRM information reported by the plurality of APs in the WLAN comprises:

when determining, according to the RRM information reported by the plurality of APs in the WLAN, that signal strengths for the STA detected by Mt APs are all greater than the default signal strength P, selecting, by the AC, Mmax APs by which signal strengths detected for the STA are the greatest from the Mt APs and adding the Mmax APs to the associated AP list for the STA, wherein Mt>Mmax.

6. The method according to claim 1, wherein controlling the STA of interest to be switched from the working channel of the first AP to the working channel of the second AP comprises:

when detecting that the number of STAs that are currently connected to the second AP and have been successfully authenticated by the AC is smaller than a difference between a set threshold and 1 and that a current average load of the second AP is smaller than a difference between a set load and a load of the STA of interest, controlling, by the AC, the STA of interest to be switched from the working channel of the first AP to the working channel of the second AP.

7. The method according to claim 1, wherein controlling the STA of interest to be switched from the working channel of the first AP to the working channel of the second AP comprises:

sending, by the AC, a first packet to the first AP, so that the first AP instructs the STA of interest to switch from the working channel of the first AP to the working channel of the second AP; and sending, by the AC, a second packet to the second AP, so that the second AP allows the STA of interest to switch from the working channel of the first AP to the working channel of the second AP according to a Service Set Identifier (SSID) associated with the STA of interest, an identifier of the first AP currently connected to the STA of interest and an identifier of the second AP to be connected to the STA of interest which are carried in the second packet.

8. A device for roaming a wireless Station (STA), the device being applied to an Access Controller (AC) and comprising:

a selecting module to determine an STA of interest which is to be roamed from a first Access Point (AP) to a second AP;

a controlling module to control the STA of interest to be switched from a working channel of the first AP to a working channel of the second AP so that the STA of interest is roamed from the first AP to the second AP; and a list processing module to determine:

a low-associated STA list for the second AP according to Radio Resource Management (RRM) information reported by the second AP, wherein the low-associated STA list for the second AP contains STAs whose signal strengths are detected by the second AP to be smaller than a default signal strength P; and an associated AP list for an STA currently connected to the first AP according to RRM information reported by a plurality of APs in a Wireless Local Area Network (WLAN) to which the AC belongs, wherein the associated AP list for the STA contains APs which detect signal strengths for the STA greater than the default signal strength P, wherein the selecting module is to determine whether the STA is the STA of interest based on the low-associated STA list for the second AP and the associated AP list for the STA.

9. The device according to claim 8, wherein the selecting module is to:

select the STA of interest to be roamed to the second AP from STAs currently connected to the first AP, when detecting that the first AP satisfies a first condition and the second AP adjacent to the first AP satisfies a second condition;

wherein the first condition comprises any one or more of the following conditions:

the number of the STAs currently connected to the first AP is greater than a set threshold, and a current average load of the first AP is greater than a set load; and wherein the second condition comprises that:

the number of STAs currently connected to the second AP is less than a set threshold and a current average load of the second AP is less than a set load.

10. The device according to claim 8, wherein the selecting module is to:

when the STA is not contained in the low-associated STA list for the second AP and the second AP is contained in but the first AP is not contained in the associated AP list for the STA, determine that the STA is the STA of interest to be roamed from the first AP to the second AP.

11. The device according to claim 8, wherein the controlling module is to:

when the number of STAs currently connected to the second AP and successfully authenticated by the AC is smaller than a difference between a set threshold and 1 and when a current average load of the second AP is smaller than a difference between a set load and a load of the STA of interest, control the STA of interest to be switched from the working channel of the first AP to the working channel of the second AP.

12. The device according to claim 8, wherein the controlling module is to:
send a first packet to the first AP, so that the first AP instructs the STA of interest to switch from the working channel of the first AP to the working channel of the second AP; and
send a second packet to the second AP, so that the second AP allows the STA of interest to switch from the working channel of the first AP to the working channel of the second AP according to a Service Set Identifier (SSID) associated with the STA of interest, an identifier of the first AP currently connected to the STA of interest and an identifier of the second AP to be connected to the STA of interest which are carried in the second packet.

13. An Access Controller (AC), comprising:
a non-transitory machine-readable storage medium storing machine-executable instructions; and
a processor configured to execute the machine-executable instructions to:
determine an STA of interest which is to be roamed from a first Access Point (AP) to a second AP; and
control the STA of interest to be switched from a working channel of the first AP to a working channel of the second AP so that the STA of interest is roamed from the first AP to the second AP,
wherein determining the STA of interest comprises selecting, by the AC, the STA of interest to be roamed to the second AP from STAs currently connected to the first AP, and
wherein selecting the STA of interest comprises:
determining, by the AC, a low-associated STA list for the second AP according to Radio Resource Management (RRM) information reported by the second AP, wherein the low-associated STA list for the second AP contains STAs whose signal strengths are detected by the second AP to be smaller than a default signal strength P;
determining, by the AC, an associated AP list for an STA currently connected to the first AP according to RRM information reported by a plurality of APs in a Wireless Local Area Network (WLAN) to which the AC belongs, wherein the associated AP list for the STA contains APs which detect signal strengths for the STA greater than the default signal strength P; and
determining, by the AC, whether the STA is the STA of interest based on the low-associated STA list for the second AP and the associated AP list for the STA.

14. A non-transitory machine-readable storage medium storing machine-executable instructions which, when invoked and executed by a processor, cause the processor to carry out the method of claim 1.

* * * * *